E. Hughes,
Tool Handle.
N° 32,249.    Patented May 7, 1861.
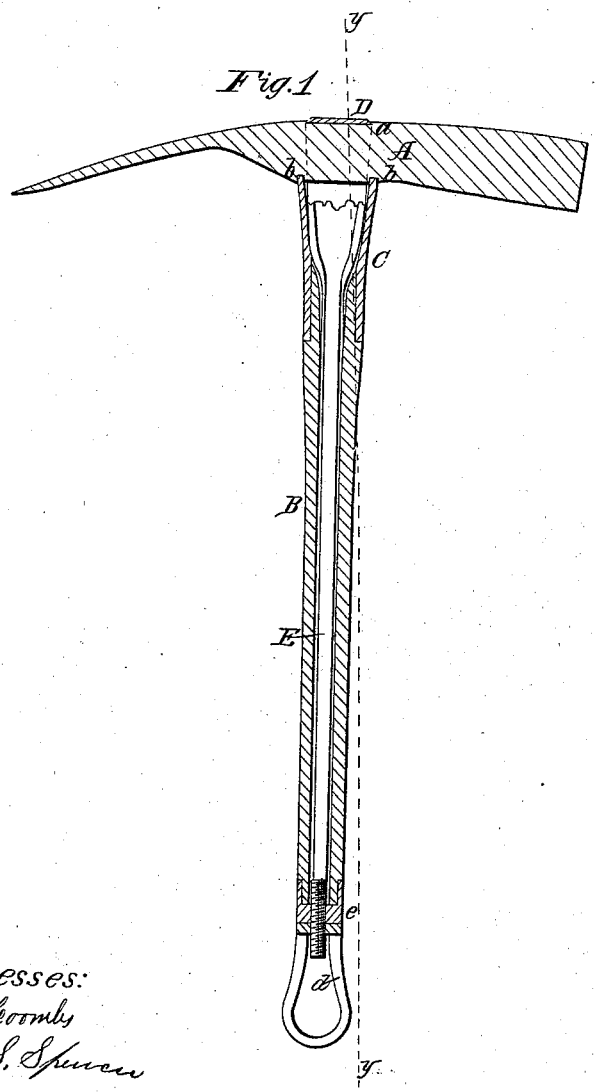
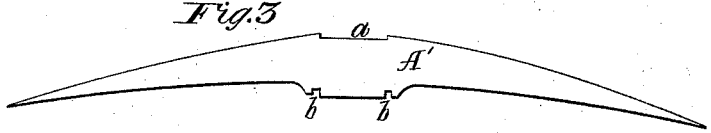
Witnesses:
Inventor:
Elisha Hughes
per Munn & Co
Attorneys

UNITED STATES PATENT OFFICE.

ELISHA HUGHES, OF McCARTYSVILLE, CALIFORNIA.

MINING-PICK.

Specification of Letters Patent No. 32,249, dated May 7, 1861.

*To all whom it may concern:*

Be it known that I, ELISHA HUGHES, of McCartysville, in the county of Santa Clara and State of California, have invented a new and useful Mode of Constructing Mining Picks and Mattocks; and I do hereby declare that the following is a full, clear, and exact description of the same, reference being had to the annexed drawings, making a part of this specification, in which—

Figure 1 is a side sectional view of a mattock having its handle attached to it according to my invention, $x$, $x$, Fig. 2 indicating the plane of section. Fig. 2 is an end sectional view of the same, taken in the line $y$, $y$, Fig. 1. Fig. 3 is a detached side view of a pick constructed so as to have its handle attached to it according to my invention.

Similar letters of reference indicate corresponding parts in the several figures.

To enable those skilled in the art to fully understand and construct my invention I will proceed to describe it.

A represents a mattock which may be of the usual shape or form, the only exception being that recesses $a$, $b$, $b$, are made in its upper and lower surfaces at its center. These recesses are all shown in Fig. 3.

B is the handle of the mattock. This handle is of wood, is hollow and has a metal socket or ferrule C, at its end as shown in Figs. 1 and 2. This socket or ferrule transversely at its outer end is of oblong form, and its edge fits in the recesses $b$, $b$, at the lower edge of the mattock A, precisely as shown in the pick A′, in Fig. 1.

D is an eye, through which the mattock A, passes. This eye D, is sufficiently broad to fill the recess $a$, at the upper edge of the mattock A, as shown in Fig. 1, the lower or inner end of the eye D, is attached to a rod E, which passes entirely through the handle B, has a screw $c$, cut on its end, and a thumb nut $d$, fitted thereon, the nut $d$, bearing against a ferrule $e$, on the end of the handle.

From the above description it will be seen that by releasing the thumb nut $d$, and slightly withdrawing the eye D, from the sockets C, the mattock may be readily detached and by placing the mattock in the eye so that the upper edge of the eye will fit in the recess $a$, and then drawing the eye within the socket by turning the nut $d$, until the outer edge of the socket is in the recesses $b$, $b$, and the mattock firmly clamped between the outer end of the eye and the socket, the mattock will be firmly secured to the handle.

Having thus described my invention what I claim as new and desire to secure by Letters Patent, is:—

The construction of mining picks and mattocks with an eyed adjusting and holding rod E, a blade notched as at $a$, $b$, ferrule C, and terminal nut $d$, the whole arranged and operating in the manner and for the purpose herein shown and described.

ELISHA HUGHES.

Witnesses:
S. O. MINOR,
TYLER BEACH.